United States Patent
Nakamura (10) Patent No.: US 8,064,652 B2
(45) Date of Patent: Nov. 22, 2011

(54) IMAGE PROCESSING APPARATUS AND CONTROL METHOD FOR PRINTING IMAGE SIZED ACCORDING TO DETERMINED FACE AREA

(75) Inventor: Takeshi Nakamura, Fuchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 962 days.

(21) Appl. No.: 11/744,360

(22) Filed: May 4, 2007

(65) Prior Publication Data

US 2007/0285680 A1 Dec. 13, 2007

(30) Foreign Application Priority Data

Jun. 8, 2006 (JP) ................................ 2006-159683

(51) Int. Cl.
*G06K 9/00* (2006.01)
(52) U.S. Cl. ........................................ 382/118; 382/115
(58) Field of Classification Search .................. 382/115, 382/118, 181, 209
See application file for complete search history.

(56) References Cited

U.S. PATENT DOCUMENTS

| 7,269,292 B2* | 9/2007 | Steinberg ...................... 382/243 |
| 2004/0252340 A1* | 12/2004 | Komagamine et al. ...... 358/1.18 |
| 2005/0018925 A1* | 1/2005 | Bhagavatula et al. ........ 382/278 |
| 2005/0117779 A1* | 6/2005 | Horie et al. ................... 382/103 |

FOREIGN PATENT DOCUMENTS

| JP | 09281605 A | 10/1997 |
| JP | 2005286737 A | 10/2005 |
| JP | 2007-306264 A | 11/2007 |

* cited by examiner

*Primary Examiner* — Brian Q Le
*Assistant Examiner* — Edward Park
(74) *Attorney, Agent, or Firm* — Canon U.S.A., Inc., IP Division

(57) ABSTRACT

An image processing apparatus configured to print a sheet to instruct outputting an image includes an analysis unit configured to analyze an image stored in an image storage unit, a conversion unit configured to convert a size of the image according to a result of the analysis performed by the analysis unit, and a printing unit configured to print the image converted by the conversion unit onto the sheet.

11 Claims, 10 Drawing Sheets

PHOTO-NAVIGATION SHEET

ACCEPTABLE EXAMPLE ●    DEFECTIVE EXAMPLE ⊖ ⊘

| 1. PRINT SETTING | SELECT SIZE/TYPE OF PRINT SHEET, AND OPTION (BLACK OUT CHECK MARK WITH PENCIL) | | | | | | |
|---|---|---|---|---|---|---|---|
| SELECT ONE ITEM FROM ITEMS LISTED ON RIGHT SIDE | L-SIZE PHOTO PAPER | 2L-SIZE PHOTO PAPER | PHOTO POSTCARD | INKJET POSTCARD | | A4 PHOTO PAPER | A4 PLAIN PAPER |
| ■ BORDERLESS PRINTING | ○ ■ | ○ ■ | ○ ■   ○ ▣ | ○ ■   ○ ▣ | | ○ ■ | |
| ▣ BORDERED PRINTING | ○ ▣ | ○ ▣ | ○ ▣   ○ ▣ | ○ ▣   ○ ▣ | | ○ ▣ | ○ ▣ |
| OPTION | ○ DATE PRINT | ○ AUTOMATIC PHOTOGRAPH CORRECTION | | ○ CORRECTION TO MAKE FACE IMAGE LOOK BRIGHTER | | | ○ RED-EYE CORRECTION |
| 2. PHOTOGRAPH SELECTION AND THE NUMBER OF PRINTS | ○ PRINT ALL PHOTOGRAPHS ON A ONE-TO-ONE BASIS | | 1●2○3○=👤×1    1○2●3○=👤×2    1○2○3●=👤×3 | | | | |

| INDEX NUMBER | THE NUMBER OF PERSONS | SIZE AFTER INDEX SIZE IS CHANGED | POSITION (X, Y) | MARK | THE NUMBER OF PRINTS | INDEX SHEET NUMBER |
|---|---|---|---|---|---|---|
| 1 | 1 | 30 | (140, 200) | 0 | 0 | 1 |
| 2 | 4 | 60 | (15, 150) | 0 | 0 | 1 |
| 3 | 4 | 60 | (85, 150) | 1 | 2 | 1 |
| 4 | 4 | 60 | (140, 150) | 0 | 0 | 1 |
| 5 | 3 | 50 | (20, 200) | 0 | 0 | 1 |
| 6 | 5 | 80 | (20, 100) | 1 | 5 | 1 |
| 7 | 5 | 80 | (120, 100) | 0 | 0 | 1 |
| 8 | 1 | 30 | (20, 250) | 1 | 1 | 1 |
| 9 | 2 | 40 | (80, 200) | 1 | 2 | 1 |
| ......... | ......... | ......... | ......... | ......... | ......... | ......... |

RELATED ART

IMAGE PROCESSING APPARATUS AND CONTROL METHOD FOR PRINTING IMAGE SIZED ACCORDING TO DETERMINED FACE AREA

BACKGROUND OF THE INVENTION

1. Field of the Invention

The present invention relates to an image processing apparatus configured to produce and read an index sheet and a control method therefor.

2. Description of the Related Art

Recently, digital input devices such as a digital cameras and image scanners, and digital output devices such as inkjet printers have been widely used. A user can perform image processing using these devices in conjunction with a personal computer (PC).

Multifunction peripherals (MFP), in which a scanner and a printer are integrated, have also been widely used. With the MFP, image processing, such as copying a photograph, can be performed without using a PC. Most home-use MFPs have a small size operation unit or a small number of keys, and a dedicated viewer is required to select an image. Therefore, an image processing operation is more difficult on an MFP as compared with a PC.

In a conventional method for printing image data stored in an external memory storage device, such as a memory card, without using a PC, a MFP including an apparatus to read image data from the external storage device is used. In this method, an index sheet is typically used to navigate through the image data.

Figure 10:
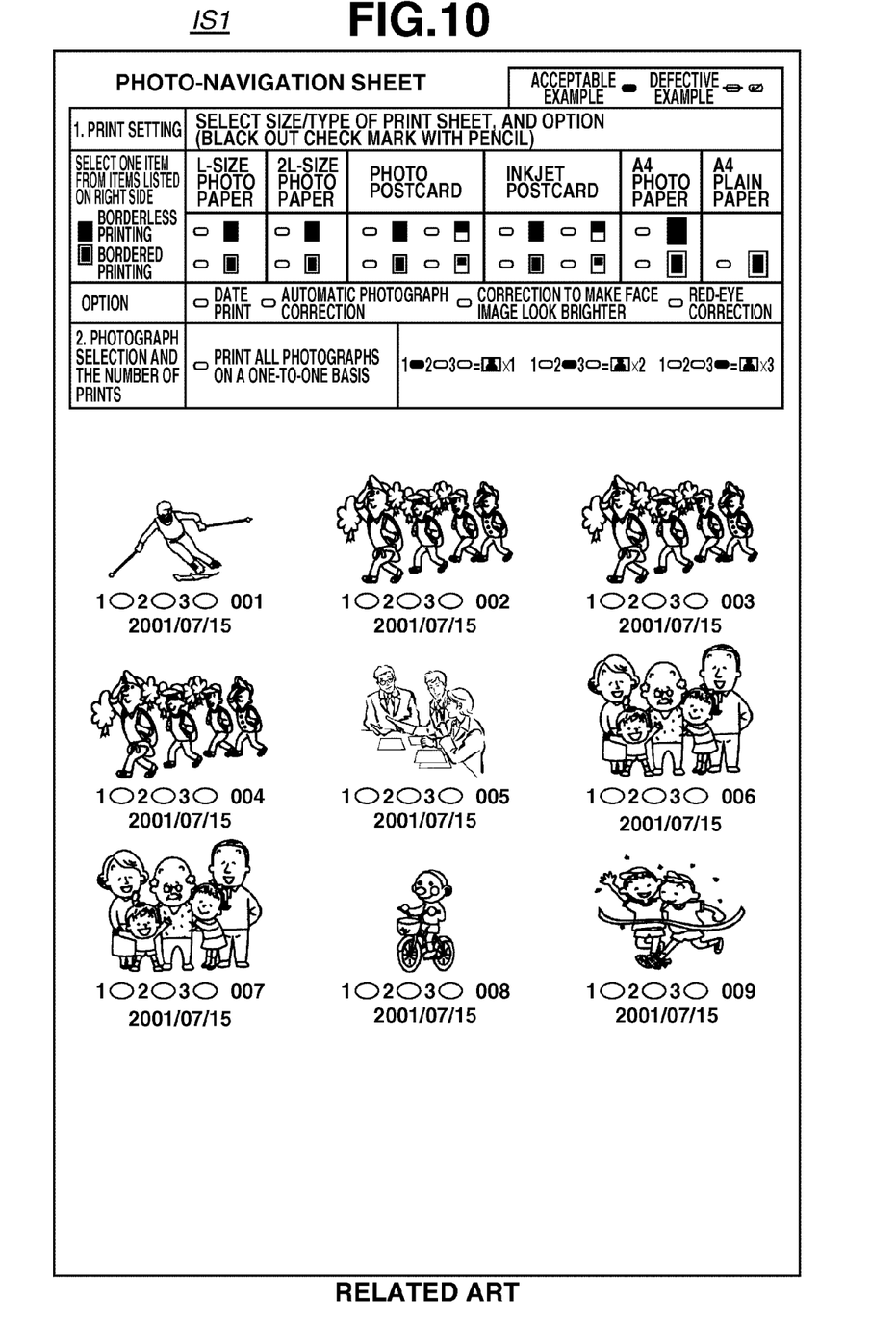
FIG. 10 illustrates a conventional index sheet.

FIG. 10 illustrates a conventional index sheet IS1. On the conventional index sheet IS1, index images, which are candidate images to be printed, are collectively printed. A mark field is provided to each of the printed index images. A mark field is also provided for designating print settings. An MFP prints the index sheet IS1. Here, an index image refers to a reduced image of the main image stored in the memory card.

A user marks the mark field for the index sheet IS1 to designate the printing settings and an image to be printed. This method is similar to a method for making an additional copy of a photograph, and therefore, is easy for a user to intuitively understand. Then, the reading unit of the MFP reads the index sheet filled in by the user, and the image data stored in the external storage device is printed according to the index sheet filled in by the user.

According to this conventional method, instead of the complicated photograph printing operation performed through an operation panel, the photograph can be easily printed without using a PC.

For a method for printing a photograph, Japanese Patent Application Laid-Open No. 09-281605 discusses an image processing apparatus which can automatically detect the number of object persons existing in an image and makes additional copies of the photograph in the detected number of object persons.

Japanese Patent Application Laid-Open No. 2005-286737 also discusses an image processing apparatus including a function for detecting the number of object persons and causing a user to select a layout sample of a photograph sticker according to the detected number of object persons.

In the case of the above-described conventional index sheet, when, for example, a photograph containing a group of object persons or a commemorative photograph, in which many persons are present, is used for an index image, each person is too small to be recognized.

Thus, good photographs can be selected only after all the candidate photographs are once printed to confirm facial expressions of the persons. Accordingly, convenience of a user becomes low, and an ink, a sheet, and time are wasted.

In the above-described conventional method, in the case of recording photographs according to the number of photographed persons, when a photograph shows a group of fifty persons and one additional copy of the photograph is desired to be made, for example, fifty additional copies are printed, which also results in wasting the ink, the sheet, and time.

In the method discussed in Japanese Patent Application Laid-Open No. 2005-286737, in selecting a layout of a photograph sticker, a desired layout can be easily selected out of a plurality of layouts considering the number of object persons. However, the persons in a photograph cannot be easily recognized when a large number of object persons are taken in a photograph.

SUMMARY OF THE INVENTION

The present invention is directed to an image processing apparatus capable of easily making an additional copy of a photograph desired by a user in the case of making a copy of an image showing a large number of persons such as a group photograph and a commemorative photograph and a method for controlling the image processing apparatus.

Furthermore, the present invention is directed to a method for improving user operability without performing complicated control or handling a complicated apparatus configuration, and a method for easily making a copy of a photograph without wasting resources such as an ink, a recording sheet, and time.

According to an aspect of the present invention, an image processing apparatus configured to print a sheet to instruct outputting an image includes an analysis unit configured to analyze an image stored in an image storage unit, a conversion unit configured to convert a size of the image according to a result of the analysis performed by the analysis unit, and a printing unit configured to print the image converted by the conversion unit onto the sheet.

According to another aspect of the present invention, a method for controlling an image processing apparatus configured to print a sheet to instruct outputting an image includes analyzing an image stored in an image storage unit, converting a size of an image according to a result of the analysis, and printing the converted image onto the sheet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features and aspects of the present invention will be described herein in detail with reference to the drawings. It is to be noted that the relative arrangement of the components, the numerical expressions, and numerical values set forth in these embodiments are not intended to limit the scope of the present invention unless it is specifically stated otherwise.

Figure 1:
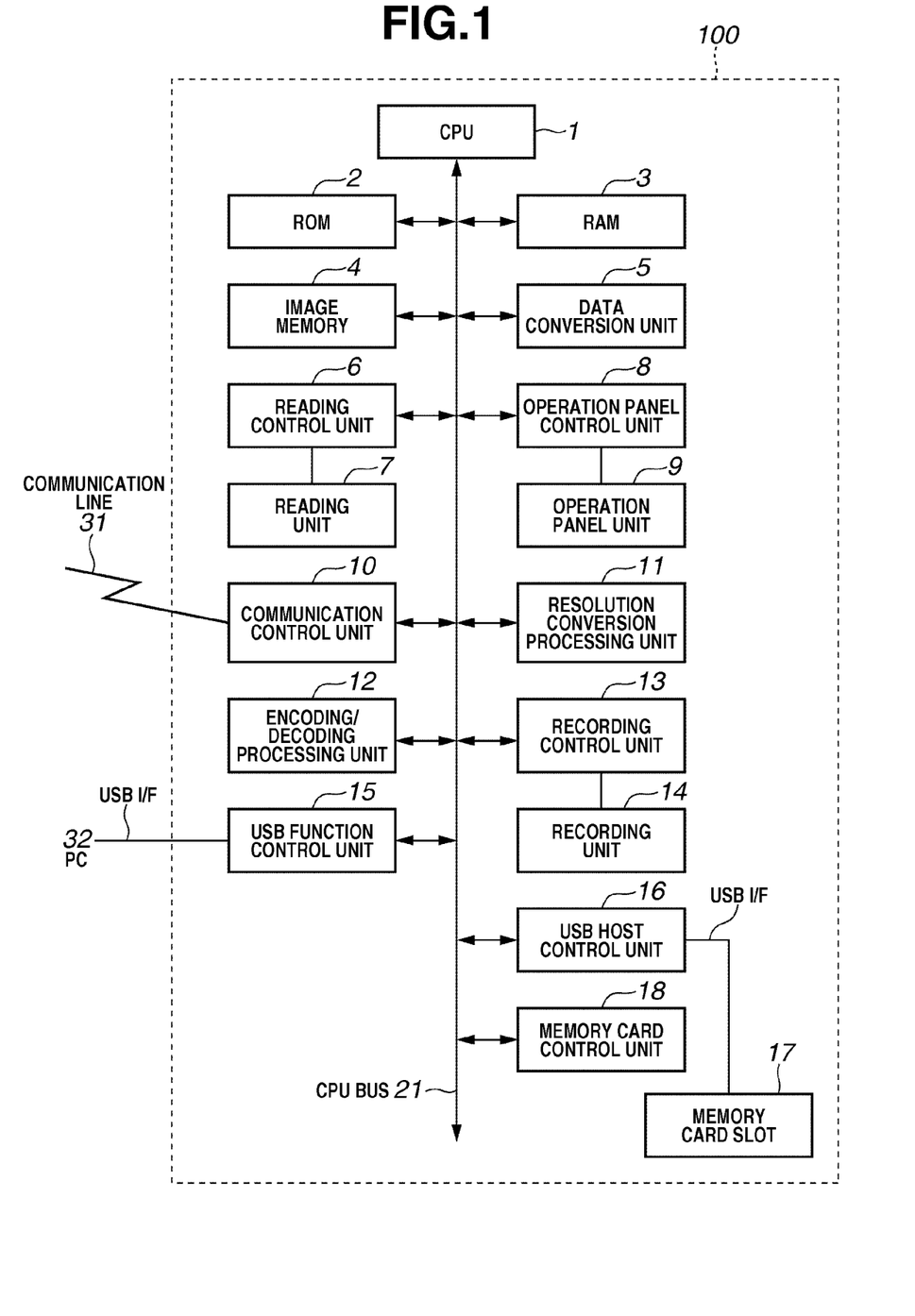
FIG. 1 is a block diagram illustrating an exemplary configuration of a multifunction peripheral (MFP) according to an embodiment of the present invention.

FIG. 1 illustrates an exemplary configuration of a multi-function peripheral (MFP) 100 according to an embodiment of the present invention. The MFP 100 includes a central processing unit (CPU) 1, a read-only memory (ROM) 2, a random access memory (RAM) 3, an image memory 4, a data conversion unit 5, a reading control unit 6, a reading unit 7, an operation panel control unit 8, an operation panel unit 9, a communication control unit 10, a resolution conversion processing unit 11, and an coding/decoding processing unit 12. The MFP 100 also includes a recording control unit 13, a recording unit 14, a universal serial bus (USB) function control unit 15, a USB host control unit 16, a memory card slot 17, a memory card control unit 18, and a CPU bus 21.

The CPU 1 is a system control unit which controls the entire MFP 100. Control programs and a built-in operating system (OS) program, which are executed by the CPU 1, are stored in the ROM 2. The control program stored in the ROM 2 performs control of software such as scheduling software and task switch software, under the control of the built-in OS stored in the ROM 2.

The RAM 3 includes a static RAM (SRAM). The RAM 3 stores program control variables, setting values registered by an operator, and management data of MFP 100. A buffer area for work memory is provided in the RAM 3.

The image memory 4 includes a dynamic RAM (DRAM). The image memory 4 stores image data. The data conversion unit 5 analyzes a page description language (PDL) and performs image data conversion such as rasterization of character data into computer graphics (CGs).

The reading unit 7 includes a charge-coupled device (CCD) or a contact image sensor (CIS). The reading unit 7 optically reads an original to convert the read original into electric image data. The reading control unit 6 controls the reading unit 7.

In the present exemplary embodiment, the reading control unit 6 conforms to a book reading control scheme for scanning an original placed on a document positioning plate.

The operation panel control unit 8 displays a guidance related to various input operations performed by an operator, an operation state of the MFP 100 such as an operating state and an error state, and the image data stored in the image memory 4.

The operation panel unit 9 includes numerical input keys, character input keys, a one-touch telephone number key, a mode setting key, an enter key, and a cancel key. The operation panel unit 9 also includes a light emitting diode (LED) and a liquid crystal display (LCD).

The communication control unit 10 includes a modem and a network control unit (NCU). In the present exemplary embodiment, the communication control unit 10 is connected with an analog communication line (PSTN) 31. The communication control unit 10 performs communication control according to the T.30 protocol that the International Telecommunications Union-Telecommunication Standardization Sector (ITU-T) recommends, and a line control such as a call request and an incoming call on a communication line. Please note that any communication protocol that would enable practice of the present invention is applicable.

The resolution conversion processing unit 11 controls resolution conversion, such as millimeter-to-inch resolution conversion of image data. The resolution conversion processing unit 11 can also perform scaling processing of image data. The coding/decoding processing unit 12 performs coding/decoding processing on image data handled by the MFP 100 (into and from Modified Huffman (MH)-coded image data, Modified Read (MR)-coded image data, Modified Modified Read (MMR)-coded image data, Joint Bi-level Image Experts Group (JBIG)-coded image data, Joint Photographic Experts Group (JPEG)-coded image data, and the like).

The recording control unit 13 performs various kinds of image processings, such as smoothing, recording density correction, and color correction on image data to be printed, through an image processing control unit (not shown), and converts the processed image data into image data for printing. The converted image data is stored in the image memory 4. The recording control unit 13 also periodically obtains state information data of the recording unit 14.

The recording unit 14 includes an inkjet printer or a monochrome printer. The recording unit 14 prints the image data converted by the recording control unit 13 and stored in the image memory 4 on a recording sheet as color image data or monochromatic image data.

The USB function control unit 15 performs communication control of a USB interface according to a USB communication standard. More specifically, the USB function control unit 15 converts data from USB control task executed by the CPU 1 into a packet to transmit a USB packet to an external information processing terminal. The USB function control unit 15 also converts the USB packet from the external information processing terminal into data to transmit the converted data to the CPU 1. In the present embodiment, the USB function control unit 15 is connected with a personal computer (PC) 32 and accesses a memory card from PC 32 so that the USB function control unit 15 prints the image data on PC 32.

The USB host control unit 16 performs communication according to a protocol defined by a USB communication standard. Using the USB communication standard, a plurality of hubs and functions (slaves) can be connected to one host (master). The USB host control unit 16 serves as a host in a USB communication, and the USB function control unit 15 serves as a function.

The memory card slot 17 is connected with the USB host control unit 16 via the USB interface, and a memory card is detachably inserted into the memory card slot 17. The memory card control unit 18 can read a main image by accessing the main image stored in the memory card that is inserted into the memory card slot 17.

The above-described components, namely, the CPU 1, the ROM 2, the RAM 3, the image memory 4, the data conversion unit 5, the reading control unit 6, the operation panel control unit 8, the communication control unit 10, the resolution conversion processing unit 11, the coding/decoding processing unit 12, the recording control unit 13, the USB function control unit 15, the USB host control unit 16, and the memory card control unit 18 are connected with one another via a bus 21 managed by the CPU 1.

Figure 2:
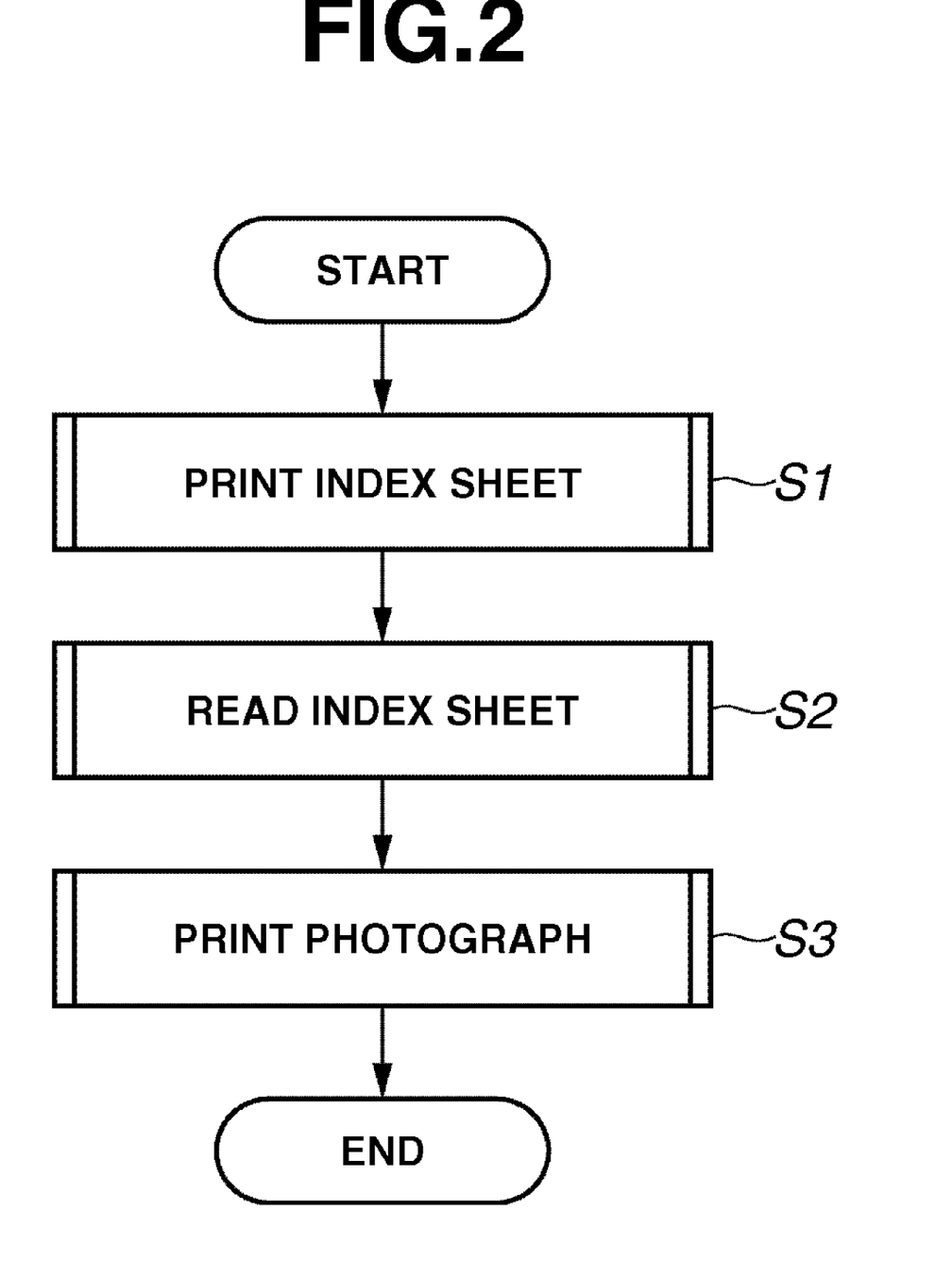
FIG. 2 is a flow chart illustrating an operation for performing a sequence for making an additional copy of a photograph with an MFP using an index sheet according to the exemplary embodiment of the present invention.
Figure 3:
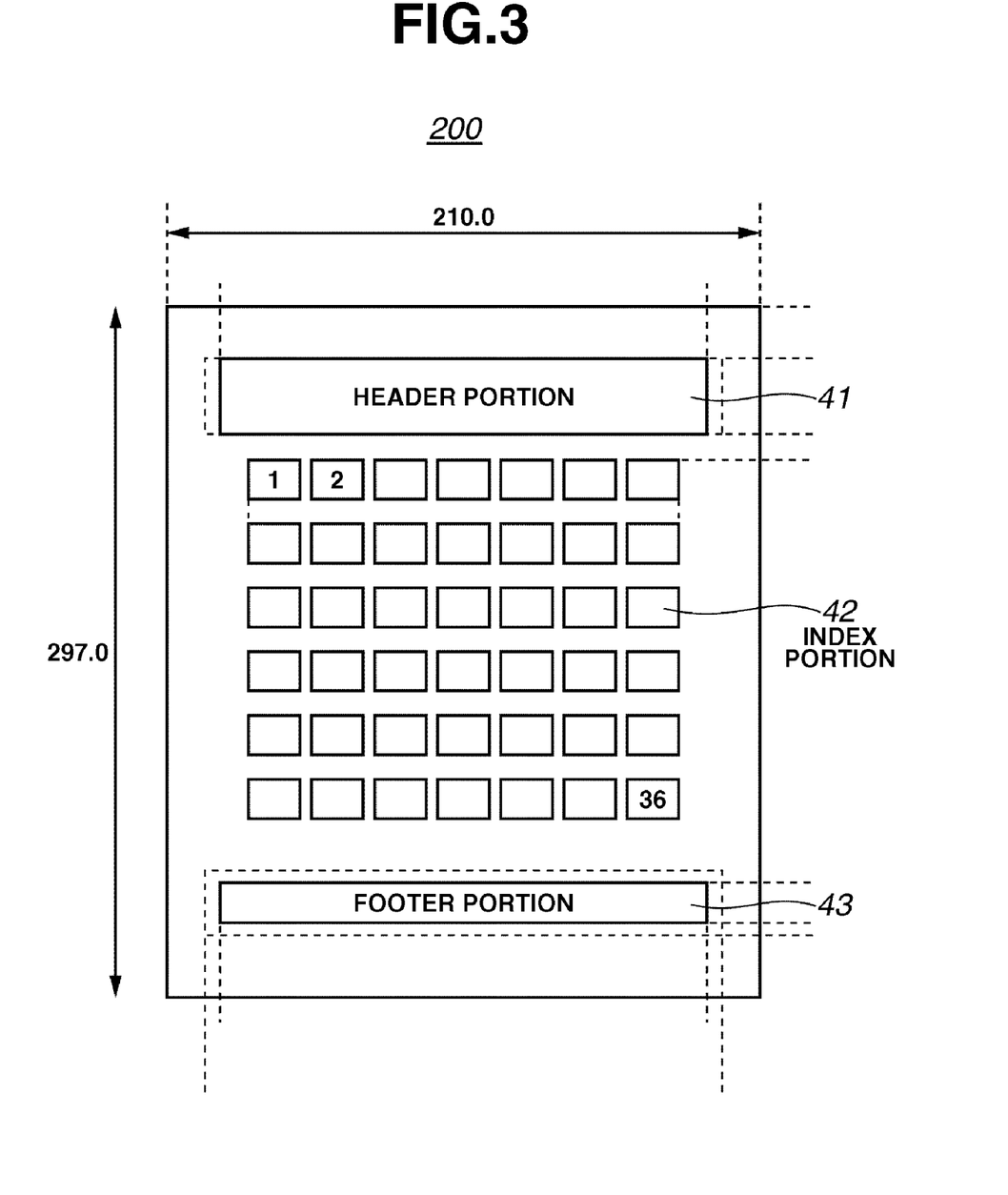
FIG. 3 illustrates an exemplary configuration of a layout of an index sheet according to the exemplary embodiment of the present invention.
Figure 4:
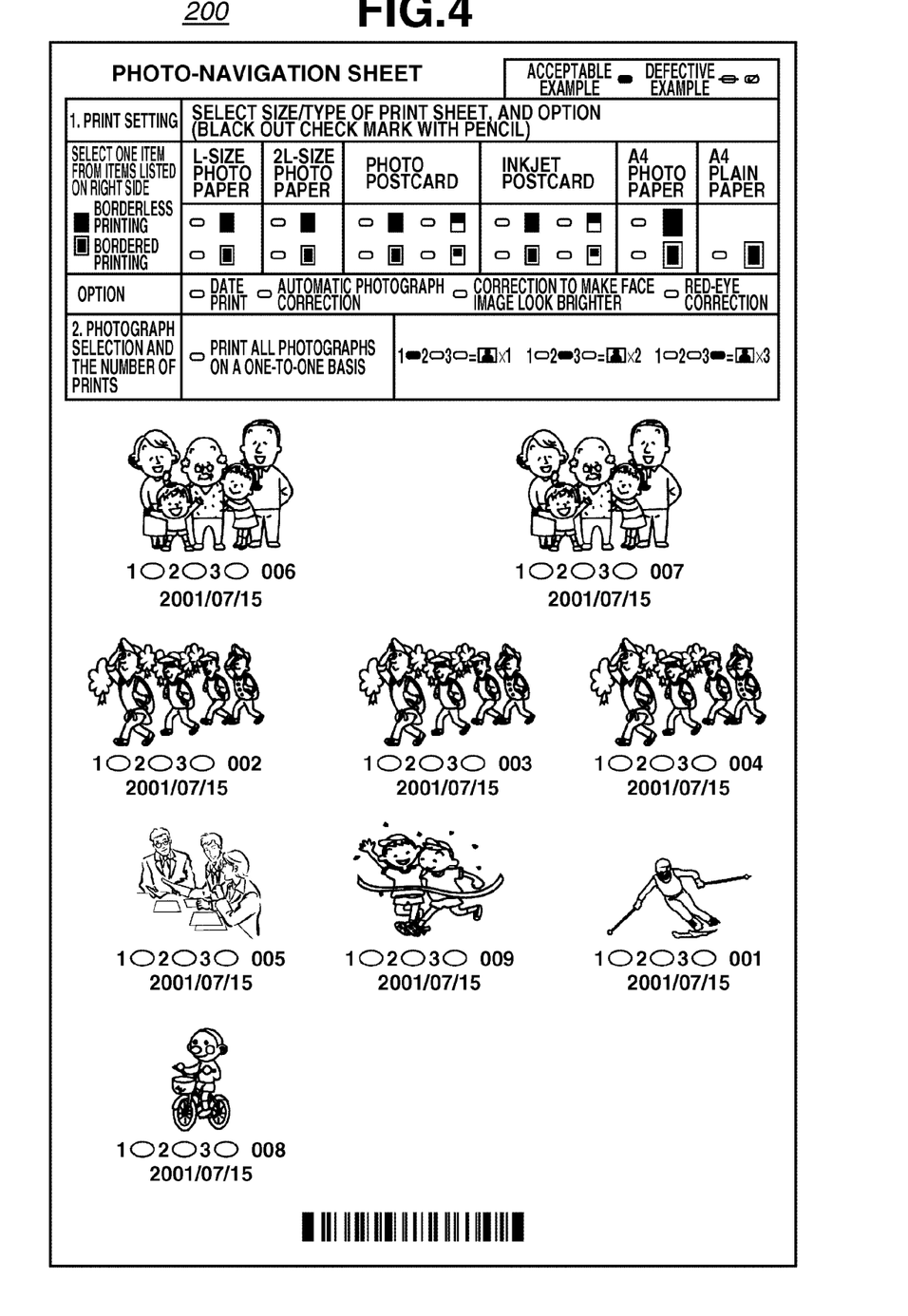
FIG. 4 illustrates an example of a printed index sheet according to the exemplary embodiment of the present invention.

FIG. 2 is a flow chart illustrating an operation in which the MFP 100 performs a sequence for making an additional copy of a photograph using an index sheet. FIG. 3 illustrates an exemplary configuration of a layout of an index sheet 200 of the present embodiment. FIG. 4 illustrates an example of a print of the index sheet 200.

When an AC power supply (not shown) is powered on, the CPU 1 performs various initial settings on the RAM 3 according to the programs stored in the ROM 2. Then, when a user gives an instruction to power-on via the operation panel unit 9, the CPU 1 performs operations for initializing various mechanisms. When the initialization operations are completed, the CPU 1 lights an LED on the operation panel unit 9 to enable a reading operation and a printing operation.

At this time, a user gives an instruction for printing the index sheet 200 as illustrated in FIG. 4 via the operation panel unit 9. As illustrated in FIG. 3, the index sheet 200 includes a header portion 41, an index portion 42, and a footer portion 43.

Print setting items such as a sheet size, a type of sheet, bordered/borderless printing, a time and date, and the presence or absence of various corrections are described in the header portion 41. The user can easily perform the settings by marking a mark field for each setting item.

An index image, the number of prints selection item, an index number, and the time and date are described in the index portion 42. Referring to the items in the index portion 42, the user selects an image whose additional copy is desired. The index number corresponds to the main image stored on the memory card.

The number of images displayed in the index portion 42, the number of prints, a position selected relating to the number of prints, and an index sheet number are displayed in the form of a barcode in the footer portion 43.

Turning to FIG. 2, in step S1, the CPU 1 performs processing for printing the index sheet 200 As compared with the conventional index sheet IS1 illustrated in FIG. 10, an object person is enlarged and can easily be recognized on the printed index sheet 200. Accordingly, the user can more easily select photographs most suitable for an additional copy and the number of additional copies.

After the user marks the desired mark field of the index sheet 200 printed in step S1, the user sets the index sheet 200 onto the reading unit 7, and the user gives an instruction for making an additional copy using the index sheet 200 via the operation panel unit 9.

In step S2, the CPU 1 performs processing for reading the index sheet 200. In step S3, the CPU 1 performs processing for printing a photograph according to a result of reading the mark selected by the user. The processing in steps S1 and S2 do not need to be performed successively, and can be performed independently of each other. By the above-described operation, the user can easily make an additional copy of the desired photographs.

Figure 5:
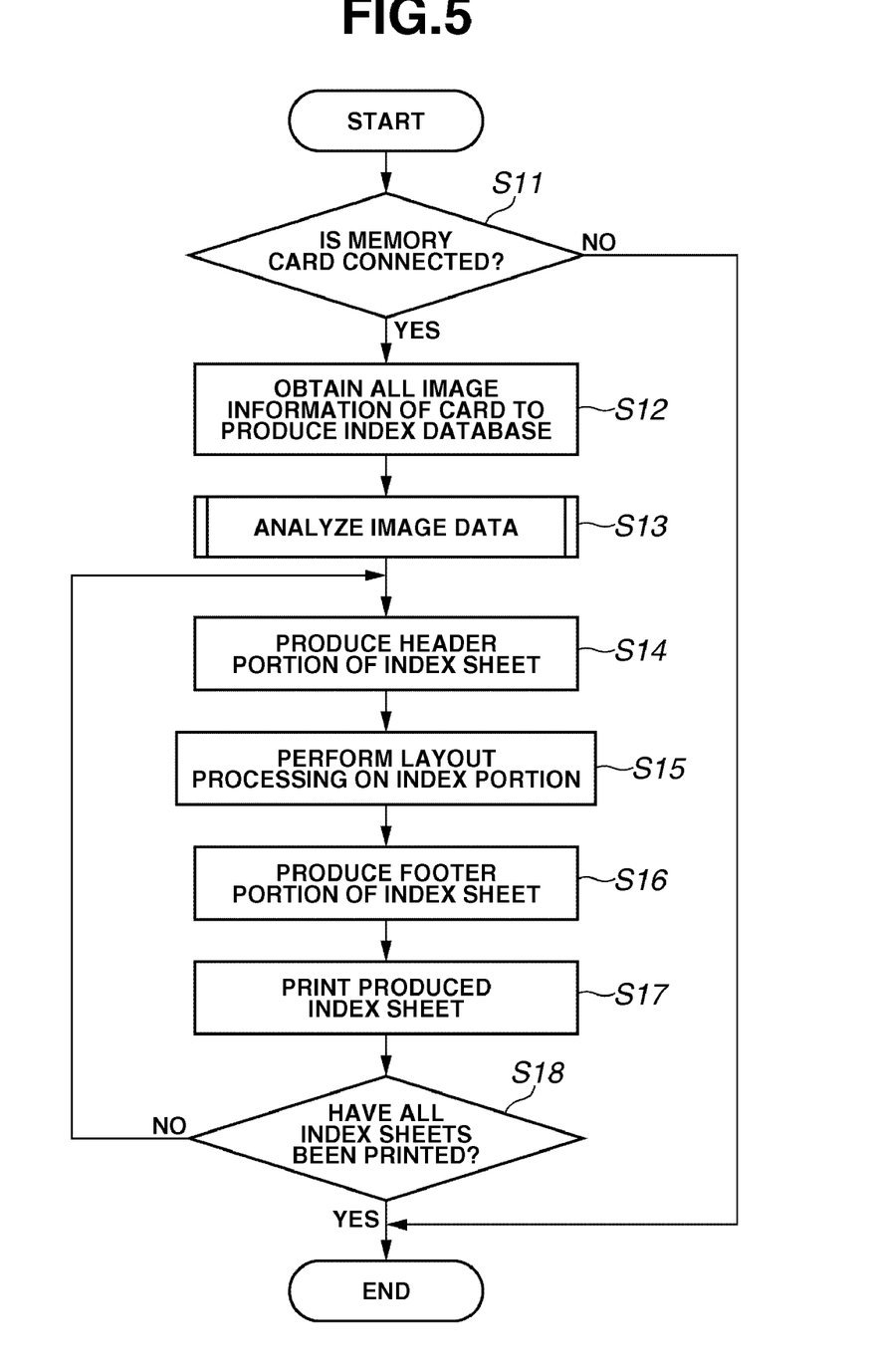
FIG. 5 is a flow chart illustrating a sequence for printing the index sheet with the MFP according to the exemplary embodiment of the present invention.

FIG. 5 is a flowchart illustrating a sequence in which the MFP 100 prints the index sheet 200. When the user gives an instruction for printing the index sheet 200 via the operation panel unit 9, the CPU 1, in step S11, determines whether the memory card is inserted into the memory card slot 17. If it is determined in step S11 that the memory card is not inserted into the memory card slot 17 (NO in step S11), then the CPU 1 notifies the operation panel unit 9 that the memory card is not inserted. Then, the CPU 1 ends the processing. The index sheet 200 which does not include any index images is not printed after the determination is made as to whether the memory card is inserted (step S11). Accordingly, waste of resources such as a recording sheet, an ink, and time can be prevented.

Figure 6:
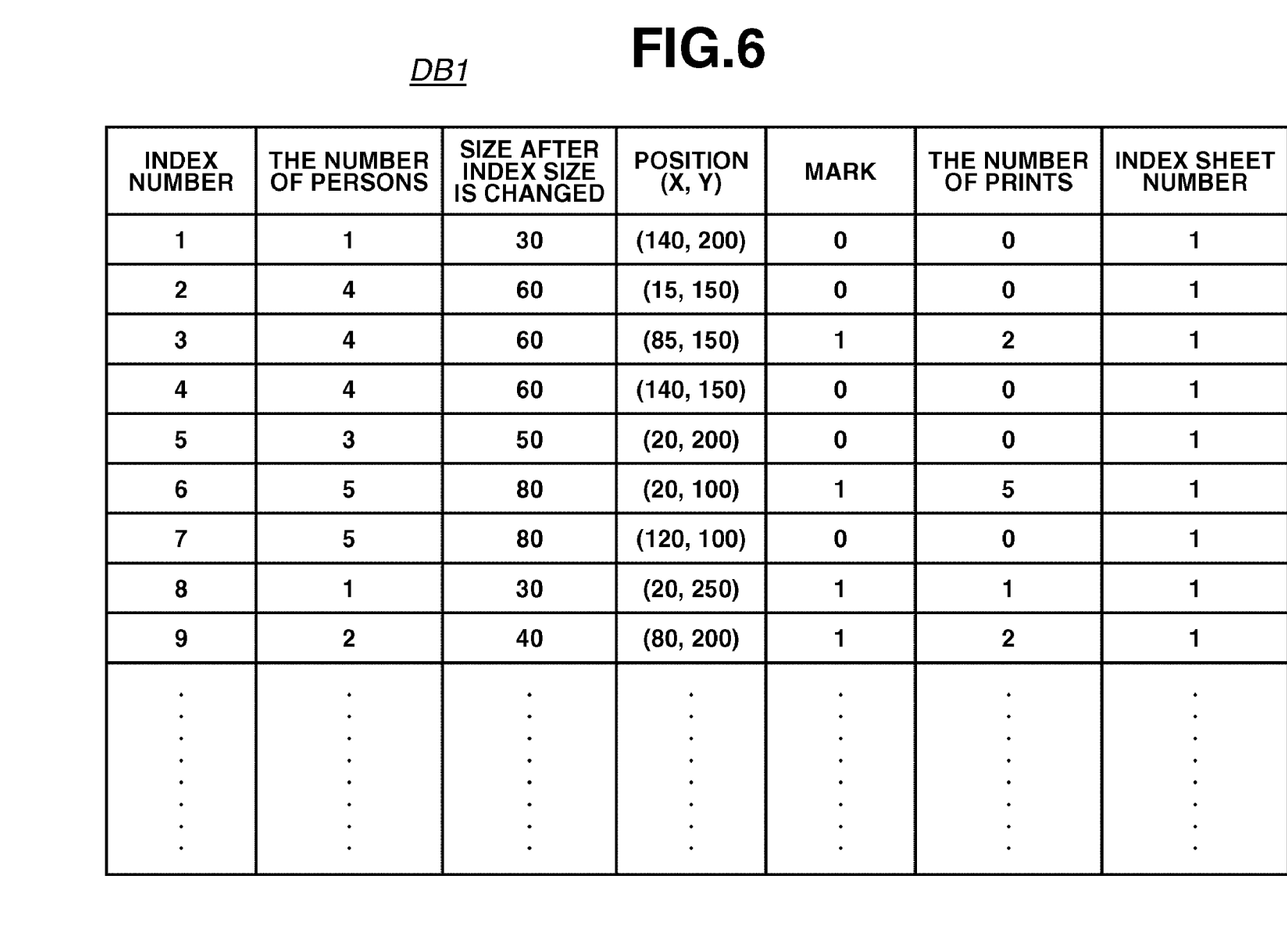
FIG. 6 illustrates an index database according to the exemplary embodiment of the present invention.

If it is determined in step S11 that the memory card is inserted (YES in step S11), then in step S12, the CPU 1 reads all the pieces of image information stored in the memory card via the memory card control unit 18 and generates an index database DB1, illustrated in FIG. 6, as an example. The index database DB1 is stored on the RAM 3. By using the generated database DB1, processing time required in analyzing an index image and changing a layout can be shortened.

In step S13, the CPU 1 analyzes the image data in an image processing unit (not shown). After the index image is completely analyzed, in step S14, the CPU 1 generates the header portion 41 for the index sheet 200 on the image memory 4. The image data analysis in step S13 is performed to recognize a face of an object person. The number of object persons in the image data can be detected by performing the face recognition processing.

Layout processing is performed on the index portion 42 of the index sheet 200 in step S15. The CPU 1 sorts the index database DB1 in the descending order according to the number of object persons detected by the image data analyzing processing. Then, the index portion 42 is laid out on the image memory 4 in the analyzing processing in the order of sorting by considering an image size after index conversion that is stored in the index database DB1. At this point of time, information about a position of the laid-out index portion 42 and the number of the index sheet 200 are stored in the index database DB1.

In the present embodiment, the index database DB1 is sorted according to the number of object persons. Alternatively, the index database DB1 can be sorted according to the image size. According to the present embodiment, the index database DB1 is sorted according to the number of object persons or the image size. Thus, the index sheet 200 can be generated which is more easily viewable for the user, compared with the case where the index database DB1 is not sorted. The layout can be generated effectively utilizing a margin by arranging an order of the images. Accordingly, the index sheet 200 can be effectively used. Thus, resources such as a recording sheet can be effectively used.

In step S16, the CPU 1 generates the footer portion 43 for the index sheet 200 on the image memory 4 according to the information stored in the index database DB1. The index sheet 200 can be quickly analyzed during the analysis of the index sheet 200 using the information stored in the index database DB1.

In step S17, the index sheet 200 generated on the image memory 4 is printed by the recording unit 14 via the recording control unit 13. In step S18, the CPU 1 refers to the index database DB1 to determine whether the printing is completed for all the index sheets 200. If it is determined in step S18 that the printing is not completed for all the index sheets 200 (NO in step S18), then the CPU 1 repeats processing in steps S14 through S17. On the other hand, if it is determined in step S18 that the printing is completed for all the index sheets 200 (YES in step S18), then the CPU 1 ends the processing. All the index sheets 200 can be printed by performing the above sequence.

Figure 7:
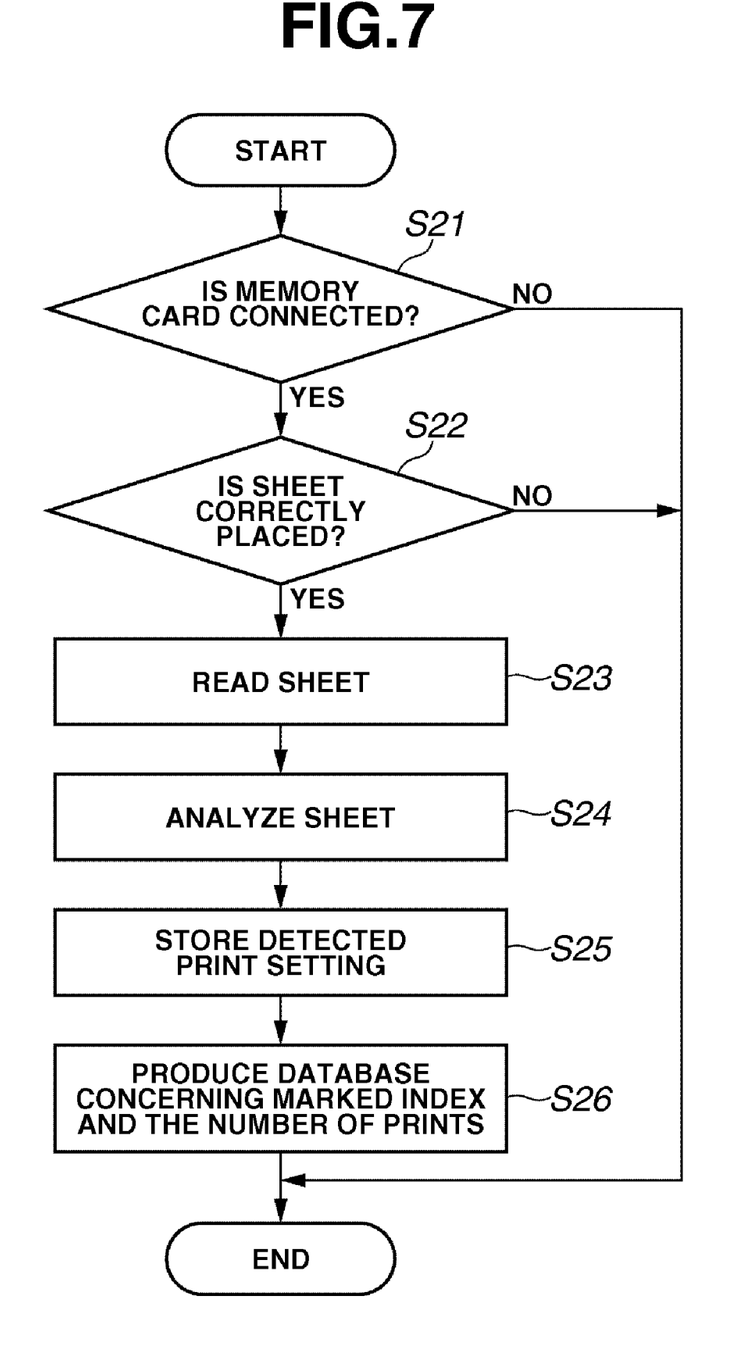
FIG. 7 is a flow chart illustrating an operation for reading the index sheet with the MFP according to the exemplary embodiment of the present invention.

FIG. 7 is a flow chart illustrating an operation in which the MFP 100 reads the index sheet 200. First, the user sets the index sheet 200 onto the reading unit 7 and then gives an instruction for making an additional copy of a photograph using the index sheet 200 via the operation panel unit 9.

In the MFP 100, in step S21, the CPU 1 determines whether the memory card is inserted into the memory card slot 17. If it is determined in step S21 that no memory card is inserted into the memory card slot 17 (NO in step S21), then the CPU 1 notifies the operation panel unit 9 that no memory card is inserted. Then, the CPU 1 ends the processing.

On the other hand, if it is determined in step S21 that the memory card is inserted (YES in step S21), then in step S22, the CPU 1 instructs the reading unit 7 to perform preliminary scanning via the reading control unit 6. Furthermore, the CPU 1 performs image processing such as edge detection on the image on which the preliminary scanning is already performed, and checks whether the index sheet 200 is correctly placed.

If it is determined in step S22 that the index sheet 200 is not correctly placed (NO in step S22), then the CPU 1 notifies the operation panel unit 9 that the index sheet 200 is not correctly placed. Then the CPU 1 ends the processing. If it is determined in step S22 that the index sheet 200 is correctly placed (YES in step S22), then in step S23, the reading unit 7 performs primary scanning of the index sheet 200.

In step S24, the CPU 1 analyzes information about the marks selected in the index sheet 200. First, the CPU 1 analyzes the header portion 41 to detect the marked print settings. Then, the CPU 1 analyzes the barcode in the footer portion 43 to detect information about a position at which the number of prints is described, and then the CPU 1 stores the detected number of prints in the index database DB1.

In step S25, the CPU 1 stores the detected print setting in the RAM 3. In step S26, the CPU 1 detects the marked index image and information about the number of prints according to the positional information analyzed and detected in step S24. Then, the CPU 1 stores the detected index image and information about the number of prints in the index database DB1.

When the above-described sequence is performed, the processing for reading the index sheet 200 is completed.

Figure 8:
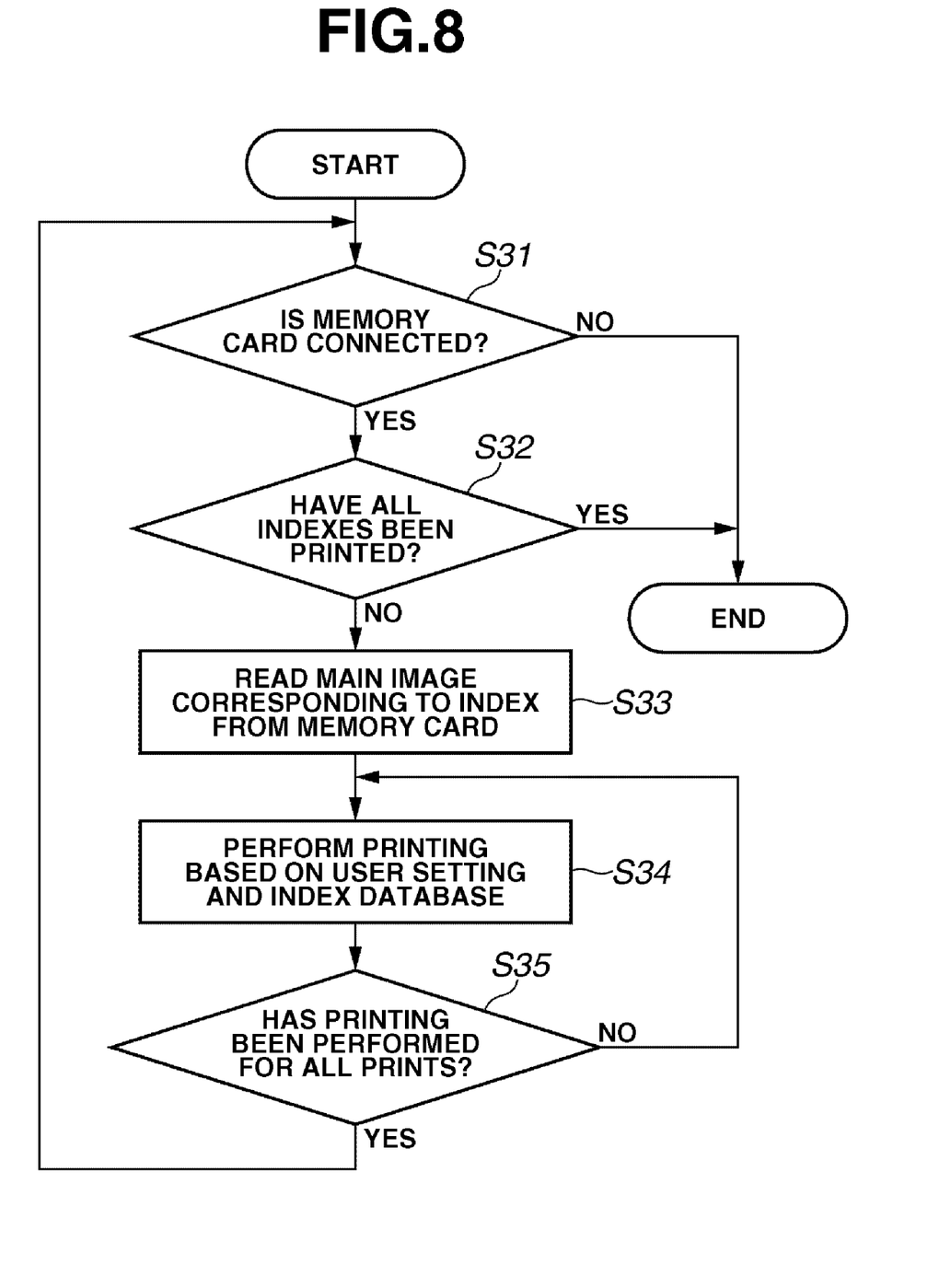
FIG. 8 is a flow chart illustrating an operation for printing a photograph with the MFP using the index sheet according to the exemplary embodiment of the present invention.

FIG. 8 is a flow chart illustrating an operation in which the MFP 100 prints a photograph using the index sheet 200. When the user gives an instruction for making an additional copy of a photograph using the index sheet 200 via the operation panel unit 9, the CPU 1 performs the sequence for reading the index sheet 200 to continuously perform the print processing.

In step S31, the CPU 1 determines whether the memory card is inserted into the memory card slot 17. If it is determined in step S31 that no memory card is inserted into the memory card slot 17 (NO in step S31), then the CPU 1 notifies the operation panel unit 9 that no memory card is inserted. Then, the CPU 1 ends the processing.

If it is determined in step S31 that the memory card is inserted (YES in step S31), then in step S32, the CPU 1 determines whether the printing is completed for all the index numbers whose mark is stored in the index database DB1. If it is determined in step S32 that the printing is completed with respect to all the index numbers (YES in step S32), then the CPU 1 ends the processing. If it is determined in step S32 that the printing is not completed (NO in step S32), then in step S33, the CPU 1 reads the main image corresponding to the marked index number from the memory card onto the image memory 4.

In step S34, the recording unit 14 prints the data on the image memory 4 according to the print setting stored during the analysis of the header portion 41. In step S35, the CPU 1 determines whether the number of prints stored in the index database DB1 is printed. If it is determined in step S35 that the number of prints stored in the index database DB1 is not printed (NO in step S35), then the CPU 1 repeats the print processing in step S34 until the number of prints stored in the index database DB1 is printed. On the other hand, if it is determined in step S35 that the number of prints stored in the index database DB1 is printed (YES in step S35), the CPU 1 returns to step S31.

When the above-described operation is performed, all the photographs marked by the user are printed in the designated number.

Figure 9:
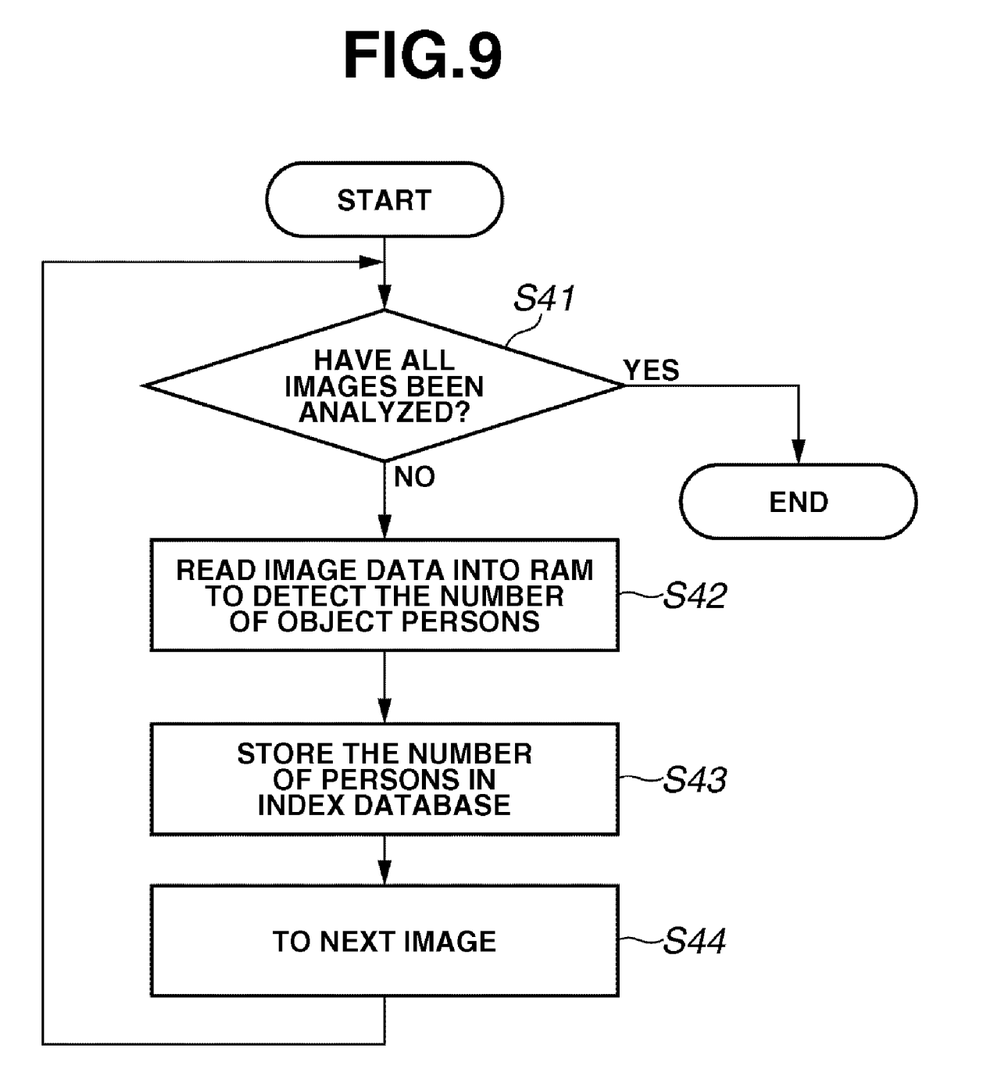
FIG. 9 is a flow chart illustrating a flow of processing for analyzing image data with the MFP according to the exemplary embodiment of the present invention.

FIG. 9 is a flow chart illustrating the image data analysis processing performed by the MFP 100. In step S41, the CPU 1 refers to index database DB1 produced in step S12 of the sequence for printing the index sheet 200 and determines whether the analysis is completed for all the pieces of image data. If it is determined in step S41 that the analysis is completed for all the pieces of image data (YES in step S41), then the CPU 1 ends the image data analysis processing.

On the other hand, if it is determined in step S41 that the analysis is not completed for all the pieces of image data (NO in step S41), then in step S42, the CPU 1 reads the main image data into the image memory 4 and detects the number of object persons in the image data using the method for detecting the number of object persons. The main image data corresponding to the index number is stored in the memory card.

In step S43, the CPU 1 converts the image size according to the number of object persons detected in step S42 and stores the converted image size and the detected number of object persons in the index database DB1. The image size is converted into the size with which the user can well recognize the face of the person. For performing the image size conversion, a look-up table (LUT) can be previously provided. Alternatively, the image size can be obtained through a computation in which the number of object persons is multiplied by a predetermined constant.

In the present embodiment, the number of object persons is detected in order to obtain the image size. Alternatively, the image size can be converted so that a face of an object person can be easily recognized by the user. Namely, a face size of an object person is detected and converted to the image size according to the size of the detected face.

In step S44, the CPU 1 advances processing of the index database DB1 to a next image, and then the CPU 1 returns to step S41.

In the above-described processing, all the pieces of image data can be analyzed and the number of object persons can be detected.

According to the present embodiment, in making an additional copy of a photograph image such as a group photograph and a commemorative photograph in which a plurality of persons are present, the image is displayed in a large size so that the user can recognize the faces of the object persons. Accordingly, an additional photograph copy desired by the user can be easily printed.

Furthermore, the image data on the index sheet 200 is not changed, and neither complicated control nor complicated apparatus configuration is employed. Accordingly, operability can be improved for the user. In addition, an additional photograph copy can be easily printed without wasting resources such as an ink, a recording sheet, and time.

Furthermore, the present invention can also be achieved by providing a system or a device with a storage medium (or a recording medium) which stores program code of software implementing the functions of the embodiments and by reading and executing the program code stored in the storage medium with a computer of the system or the device (a CPU or a micro processing unit (MPU)). In this case, the program code itself, which is read from the storage medium, implements the functions of the embodiments mentioned above, and accordingly, the storage medium storing the program code constitutes the present invention.

In addition, the functions according to the exemplary embodiments described above can be implemented not only by executing the program code read by the computer, but also implemented by the processing in which an operating system (OS) or the like carries out a part of or the whole of the actual processing based on an instruction given by the program code.

Further, after the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments as described above.

In addition, the image processing apparatus in the MFP 100 can be a copying machine including, in combination, an information processing apparatus such as a computer, a single-function reading apparatus, and a single-function inkjet image recording apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-159683 filed Jun. 8, 2006, which is hereby incorporated by reference herein in its entirety.

What is claimed is:

1. An image processing apparatus comprising:
a first determining unit configured to determine an area corresponding to a face of a person in an image stored in a memory;
a second determining unit configured to determine a size of the whole of the image based on a size of the area determined in the image by the first determining unit;
a generating unit configured to generate image data corresponding to the whole of the image according to the size determined by the second determining unit; and
a print control unit configured to cause a printing apparatus to print the image onto a sheet based on the image data generated by the generating unit,
wherein, in a case where there are an image whose area corresponding to a face of a person is large and an image whose area corresponding to a face of a person is small, the second determining unit determines the size of the whole of the image such that a size of the whole of the image of the small area becomes larger than that of the large area.

2. The image processing apparatus according to claim 1, wherein the second determining unit determines a size of the whole of the image according to a number of areas corresponding to faces determined by the first determining unit.

3. The image processing apparatus according to claim 1, further comprising a deciding unit configured to decide a layout of the image according to a size of the whole of the image determined by the second determining unit, wherein the print control unit causes a printing apparatus to print the image onto a sheet according to the layout decided by the deciding unit.

4. The image processing apparatus according to claim 3, wherein the deciding unit decides an order of images stored in the memory according to an order of image size determined by the second determining unit, and the print control unit causes a printing apparatus to print the image onto a sheet according to the order decided by the deciding unit.

5. The image processing apparatus according to claim 1, wherein the second determining unit determines a size of the whole of the image according to a size of an area corresponding to a face of a person determined by the first determining unit.

6. An image processing method comprising:
determining an area corresponding to a face of a person in an image stored in a memory;
determining a size of the whole of the image based on a size of the area determined in the image;
generating image data corresponding to the whole of the image according to the determined size of the whole of the image;
causing a printing apparatus to print the image onto a sheet based on the generated image data,
wherein, in a case where there are an image whose area corresponding to a face of a person is large and an image whose area corresponding to a face of a person is small, the size of the whole of the image is determined such that a size of the whole of the image of the small area becomes larger than that of the large area.

7. The method according to claim 6, wherein a size of the whole of the image is determined according to a number of determined areas corresponding to faces.

8. The method according to claim 6, further comprising:
deciding a layout of the image according to the determined image size,
wherein the image is printed by the printing apparatus onto a sheet according to the decided layout.

9. The method according to claim 8, wherein an order of images stored in the memory is decided according to an order of determined image size, and the images are printed by the printing apparatus onto a sheet according to the decided order.

10. The method according to claim 6, wherein a size of the whole of the image is determined according to a size of a determined area corresponding to a face of a person.

11. A non-transitory computer-readable storage medium storing computer-executable process steps, the computer-executable process steps causing a computer to execute the method of claim 6.

* * * * *